United States Patent
Okubo et al.

(10) Patent No.: US 6,801,640 B1
(45) Date of Patent: Oct. 5, 2004

(54) GATE CONTROL DEVICE

(75) Inventors: Tatsuya Okubo, Kyoto (JP); Shigeo Atarashi, Kyoto (JP)

(73) Assignee: Omron Corporation (JP)

( * ) Notice: Subject to any disclaimer, the term of this patent is extended or adjusted under 35 U.S.C. 154(b) by 459 days.

(21) Appl. No.: 09/586,978

(22) Filed: Jun. 5, 2000

(30) Foreign Application Priority Data

Jun. 3, 1999 (JP) .............................. 11-156200

(51) Int. Cl.$^7$ .............................. G06K 9/00; G06K 9/20; G06T 7/00; G06F 7/04
(52) U.S. Cl. ....................... 382/118; 382/115; 340/5.2; 340/5.53; 340/5.83; 348/143; 348/156
(58) Field of Search ................. 340/5.2, 5.53, 340/5.8, 5.81, 5.82, 5.83; 382/103, 115, 118; 348/143, 156

(56) References Cited

U.S. PATENT DOCUMENTS

| | | | | |
|---|---|---|---|---|
| 3,564,132 A | * | 2/1971 | Baker et al. | 348/156 |
| 3,701,100 A | * | 10/1972 | Yarbrough | 340/5.5 |
| 3,866,173 A | * | 2/1975 | Moorman et al. | 340/5.54 |
| 4,627,193 A | * | 12/1986 | Schwarz | 49/42 |
| 5,012,522 A | * | 4/1991 | Lambert | 382/118 |
| 5,408,536 A | * | 4/1995 | Lemelson | 382/115 |
| 5,581,630 A | * | 12/1996 | Bonneau, Jr. | 382/116 |
| 5,859,930 A | * | 1/1999 | Chase | 382/218 |
| 6,035,055 A | * | 3/2000 | Wang et al. | 382/118 |
| 6,128,397 A | * | 10/2000 | Baluja et al. | 382/118 |
| 6,173,068 B1 | * | 1/2001 | Prokoski | 382/115 |
| 6,184,926 B1 | * | 2/2001 | Khosravi et al. | 348/239 |
| 6,188,777 B1 | * | 2/2001 | Darrell et al. | 382/103 |
| 6,388,558 B1 | * | 5/2002 | Emmei | 340/5.2 |
| 6,418,235 B1 | * | 7/2002 | Morimoto et al. | 382/118 |
| 6,496,595 B1 | * | 12/2002 | Puchek et al. | 382/124 |
| 6,600,509 B1 | * | 7/2003 | Kent et al. | 348/143 |
| 6,611,195 B1 | * | 8/2003 | Manneschi et al. | 340/5.52 |
| 6,617,970 B2 | * | 9/2003 | Makiyama et al. | 340/573.1 |
| 6,700,999 B1 | * | 3/2004 | Yang | 382/118 |

FOREIGN PATENT DOCUMENTS

| | | | | |
|---|---|---|---|---|
| DE | 3233843 C1 | * | 1/1984 | E06B/5/00 |
| JP | 11185087 A | * | 7/1999 | G07C/9/00 |
| JP | 2000315290 A | * | 11/2000 | G08B/25/04 |

* cited by examiner

Primary Examiner—Jingge Wu
Assistant Examiner—Ryan J. Hesseltine
(74) Attorney, Agent, or Firm—Dickstein Shapiro Morin & Oshinsky LLP

(57) ABSTRACT

The present invention discloses a gate control device which controls the passage (e.g., entry, exit, etc.) through a passageway of both authorized persons and unauthorized companions of authorized persons into a protected room. The device may be configured such that the unauthorized companions may be permitted or denied passage if the unauthorized companions are with an authorized person. For example, the device may be configured to allow an entire group of persons to enter a room if only one authorized person is present. In another example, the device may deny passage to the entire group if it contains even one unauthorized person.

13 Claims, 3 Drawing Sheets

11. GATE CONTROL DEVICE
12. ROOM
13. DOORWAY
14. CCD CAMERA
15. PERSON
16. DOOR
17. PERSONAL COMPUTER

GATE CONTROL DEVICE

This is a co-pending application of our previous patent application which we filed on May 19, 2000, titled Gate Control Device, and issued application Ser. No. 09/574,000.

BACKGROUND OF THE INVENTION

1. Field of the Invention

This invention concerns a gate device which controls passage (e.g., entry, exit, etc.) through a passageway of a person to a room by comparing on-site facial image data with previously taken facial image data. The previously taken facial image data includes the passage (e.g., entry, exit, etc.) permission data indicating whether the person has permission to enter the room. More specifically, this invention concerns a gate control device which can be programmed to determine whether or not a companion of the person having passage permission is also authorized to enter the room.

2. Discussion of the Related Art

Generally speaking, this sort of gate control device requires that data representing the facial image or the information on the I.D. card of each person authorized to enter is recorded before the system is in operation. When a person wishes to enter, an image comparison unit attempts to match his facial image or the information on his I.D. against the previously stored data. If it determines that he is authorized to enter, it grants him access; if it determines that he is not authorized to enter, it denies him access.

When several persons wish to enter a room using this sort of conventional gate control device, however, all but one must wait as the comparison unit can only match the facial data for one individual at a time. This results in significant waiting time when a number of people request passage. Further, when an unauthorized companion whose data is not in the system tries to enter a room at the same time as an authorized person whose data is already on record, the conventional gate control device will not be able to distinguish between the authorized person entering the room with the unauthorized companions from the authorized person entering alone. As a result, everyone must wait when a number of people try to enter at the same time in the first case, and there is a real possibility that an unauthorized person can slip in despite the security system in the second case.

SUMMARY OF THE INVENTION

An object of this invention is to provide a gate control device which can control the passage into an otherwise restricted area of unauthorized companions of an authorized person according to a programmed rule whereby the unauthorized companions can be permitted or denied passage when they are accompanying an authorized person.

The invention relates to a gate control device which comprises, data recording means to record facial data representing whether or not a person at the gate may enter the room; facial detecting means to detect, on the basis of the facial data recorded in the data recording means, whether the person trying to enter the room is or is not authorized to do so; and mode setting means to establish whether or not the passage of the unauthorized companions should be permitted when the facial detecting means detects the unauthorized companions at the gate who are with the authorized person.

According to another aspect of this invention, the gate control device has: data recording means to record facial data representing whether or not a person at the gate may enter the room; facial detecting means to detect, on the basis of the facial data recorded in the data recording means, whether the person trying to enter the room is or is not authorized to do so; and passage rejecting means to reject the passage of the authorized person and unauthorized companions when the facial detecting means detects the unauthorized companions at the gate who are with the authorized person.

According to yet another aspect of this invention, the facial detecting means of the gate control device described above detects the companions when it detects the authorized person at the gate by comparing the facial image taken by a camera with the recorded facial data.

With this invention, when the facial data for the person at the gate are compared with the stored data, the facial detection means determines whether that person may enter based on data recorded by the data recording means. If he is authorized, he is permitted to enter; if he is not authorized, he is denied passage. If he is authorized and the facial detection means determines that other individuals, such as companions, are also present at the gate, passage will be permitted or denied according to the rule programmed previously by mode setting means.

Various sorts of rules might be constructed regarding passage, such as "Allow unauthorized persons passage if accompanied by an authorized person" or "Deny passage to entire group if a single unauthorized person is present."

If such rules are established regarding the passage of more than one person, the image data need not be compared for each person at the gate. Since passage can be granted or denied to the group as a whole, there will be no waiting time while the facial detecting means runs through everyone's data. Furthermore, since a rule is established for group passage, proper security can be maintained even though several people enter at the same time.

Similarly, when the image data for the person at the gate is checked and the facial detecting means determines, based on the data recorded in the data recording means, that there are other individuals present at the gate in addition to the authorized person, the passage rejecting means can refuse to open the gate. This system effectively denies passage to any but authorized persons and reliably prevents anyone from slipping in with an authorized person. It thus insures adequate security regarding the passage of several persons at a time.

The detection device may be configured so as to comprise a means to compare image data gathered by a camera which detects the person at the gate with data recorded by a recording device as well as a means to determine from the image data whether other people are present at the gate. If the result of the comparison is that the person is authorized to enter, and the image data shows that there are other people present, all of the people at the gate will be detected as a group, so this can enable efficient control of the gate.

DETAILED DESCRIPTION OF A PREFERRED EMBODIMENT

We shall now give a detailed description of a preferred embodiment of the invention with reference to the drawings.

Figure 1:
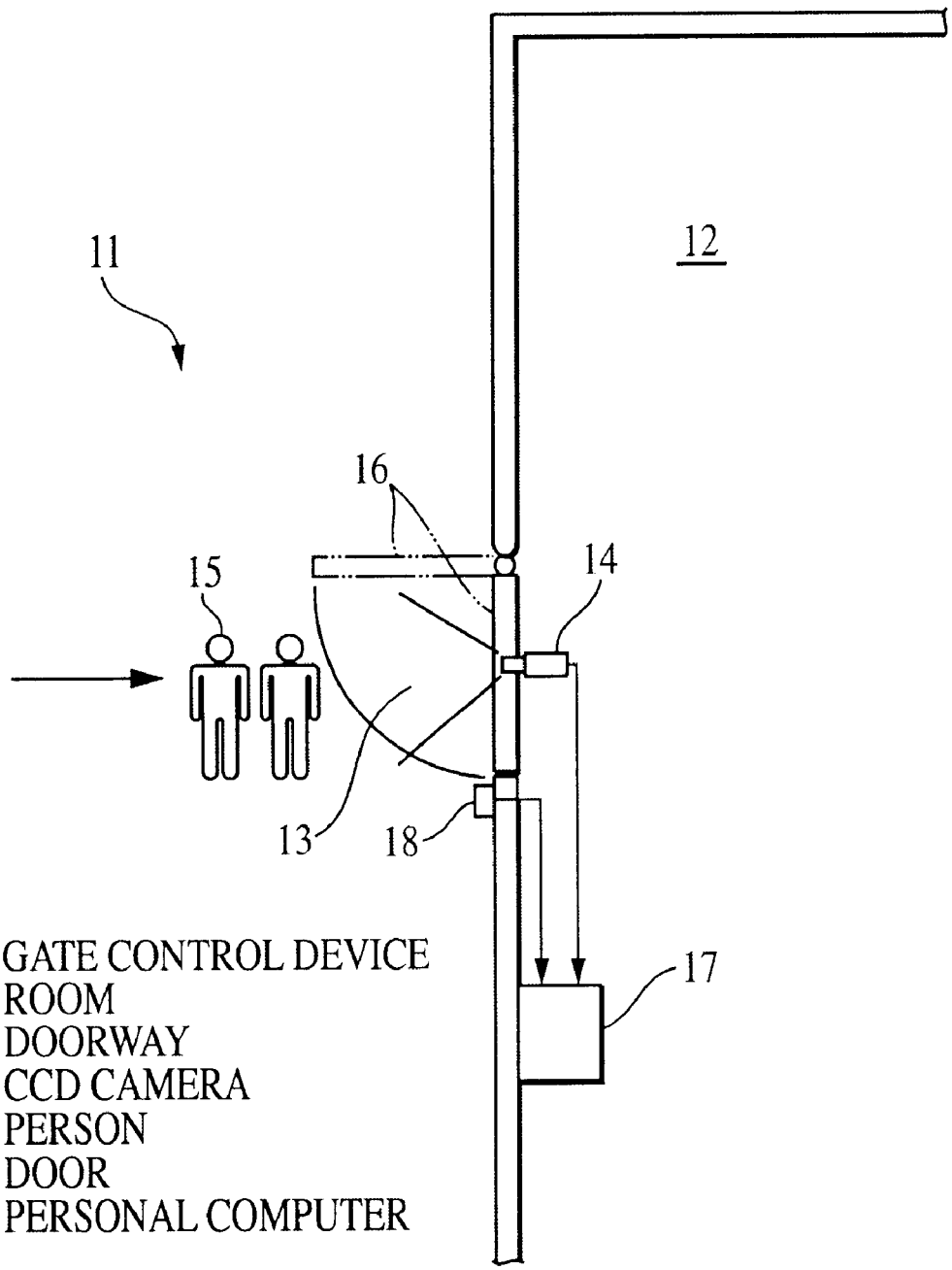
FIG. 1 is a simplified plan view of a gate control device, in accordance with an embodiment of the invention.

The drawings show a gate control device which regulates the passage of individuals into a room. As can be seen in FIG. 1, gate control device 11 employs a CCD camera 14 in doorway 13 of room 12. This camera monitors the passage of person 15 into room 12 via doorway 13.

Camera 14 is mounted on the outer surface of door 16, which opens and closes doorway 13 of room 12. It is aimed so as to capture an image of the face of person 15, the person who wishes to go through doorway 13. The camera can clearly capture the image of the features of a person's 15 face including its expression and the shape of the eyes, nose and mouth.

When the camera captures data concerning a person's 15 face, it acquires a variety of data which distinguish that particular individual from others, including the appearance of the eyes, nose and mouth, the shape and size of the face, the hairstyle, whether he wears glasses, the color of his skin, where he has wrinkles and what sort of cosmetics he wears. The data which the camera obtains is used as elements to compare the person's 15 image to a template. The facial image data taken at the time of attempted passage is compared to that previously recorded for person 15 so that his identity can be verified each time he attempts to enter the room.

The image data for the face which is captured by CCD camera 14 is sent to a surveillance unit such as personal computer 17. This unit determines whether person 15, the person who wishes to enter the room, is or is not authorized to enter. Near door 16 is initiation key 18 to initiate passage. Surveillance of doorway 13 begins when initiation key 18 is activated.

Figure 2:
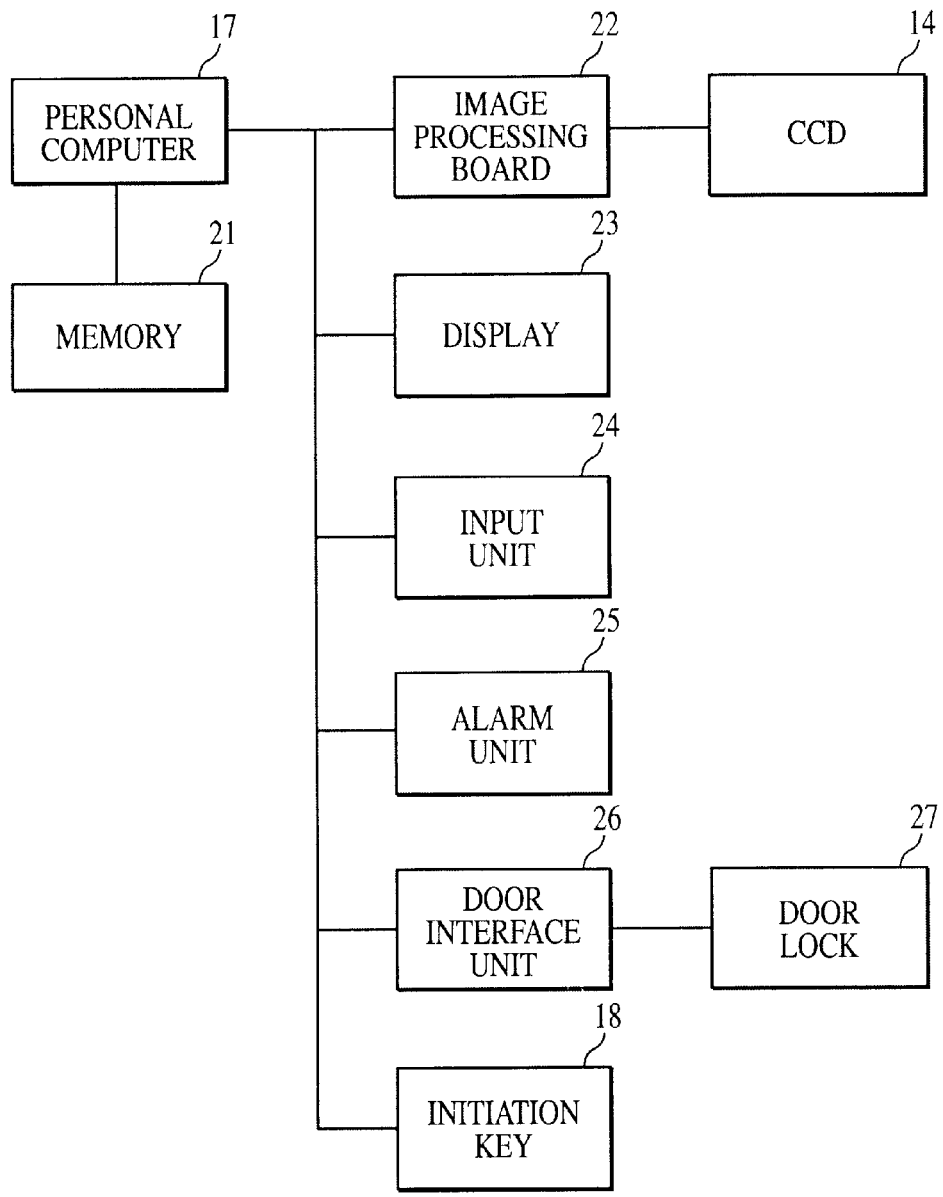
FIG. 2 is a simplified block diagram of control circuits used in the FIG. 1 gate control device, in accordance with an embodiment of the invention.

FIG. 2 is a simplified block diagram of control circuits used in gate control device 11, in accordance with an embodiment of the invention. Personal computer 17, which monitors the doorway, controls all the circuit units according to a program which is stored in memory 21. These circuit units include: image processing board 22, display 23, input unit 24, alarm unit 25, door interface unit 26 and initiation key 18. Control data for these circuits are stored in memory 21 and may be accessed for controlling the circuits.

Data describing the facial features of authorized persons is recorded before the system is in operation and stored in memory 21. Personal computer 17 compares the facial image data captured by CCD camera 14 for a person's (e.g., 15 of FIG. 1) face with the data stored in memory 21 to determine whether the person is authorized to enter. Based on the result of this determination, the appropriate steps are taken to allow or prevent passage.

When image processing board 22 receives the image of the person's 15 face from CCD camera 14, it generates a facial image which can more easily be compared. Board 22 compares a feature count of the generated facial image with a count for the previously recorded facial image to determine whether or not the person is authorized to enter.

Display 23 presents the image captured by CCD camera 14 as well as various data used to guide the comparison. Input unit 24 has a keyboard or mouse to enter various data concerning the person whose image is in the memory.

When personal computer 17 determines, with the help of CCD camera 14, that an unauthorized person is at the gate who must be prevented from entering, alarm unit 25 sounds an alarm buzzer or broadcasts via loudspeaker that the person may not enter.

Door interface unit 26 locks or unlocks the door using door lock 27 based on data sent by personal computer 17.

Based on the facial data of persons authorized to enter which is stored in memory 21, personal computer 17 detects whether the person at the gate may or may not enter. If the person is authorized, it permits passage. If the person is not authorized, it prevents passage. In addition, personal computer 17 establishes ahead of time whether the person may enter the room 12 with unauthorized companions. The rule regarding companions is invoked when CCD camera 14 detects that other persons are present in an image containing an authorized person. These companions will be allowed or denied passage according to the rule previously established in personal computer 17 regarding the passage of companions.

If, for example, the rule which was established earlier is "Allow passage to unauthorized persons if accompanied by an authorized person," several persons will be allowed to enter as a group. This will eliminate waiting time and make passage more efficient for the companions. As an example, if the president of the company is authorized for passage, he will be able to bring in a client or secretary without hindrance.

If the rule for passage is "Prevent passage of entire group if it contains a single unauthorized person," no one will be allowed to bring in an unauthorized person. This scheme is appropriate to control the passage of more than one person in high-security situations.

Since CCD camera 14 can detect everyone who wishes to enter at once, the system can compare and verify the data efficiently in one attempt. This allows us to achieve a smoothly functioning passage system which permits several people to enter at a time.

Since the rule governing the passage of more than one person is established before the system is in operation, it can be programmed to provide whatever sort of passage control is desired.

Figure 3:
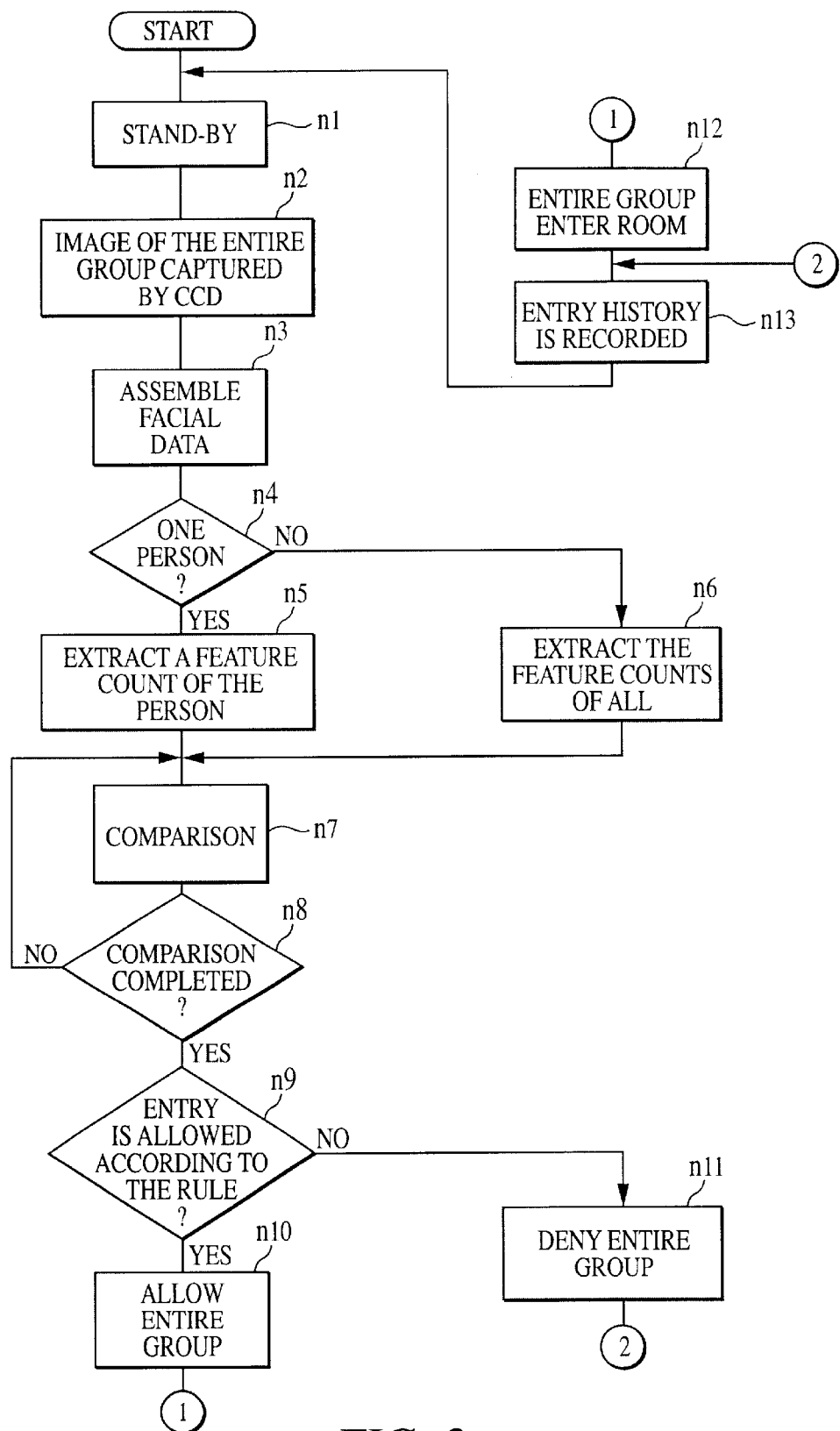
FIG. 3 is a flow chart depicting an operational flow executed by the FIG. 1 gate control device, in accordance with an embodiment of the invention.

We shall now explain the processing executed by gate control device 11 with reference to the flow chart in FIG. 3. For exemplary purposes, personal computer 17 has been configured such that passage (e.g., entry) is to be denied if a group contains even one unauthorized person.

Ordinarily, door 16 of room 12 is locked by lock 27 to secure doorway 13. CCD camera 14 monitors the area in front of door 16. As long as the camera registers that there is no one standing in front of the door, the system remains in stand-by status (Step n1).

If in this state a person appears in the image captured by CCD camera 14 (Step n2), the camera detects his face, assembles data regarding his facial features and determines the number of people in the image (Step n3).

If there is only one person in the image, the image processor extracts a feature count from the features of the imaged face, namely the eyes, nose and mouth, to be used for matching, and generates matching data for one individual (Steps n4 and n5).

If there is more than one person in the image, the image processor extracts feature counts for everyone in the image and generates matching data for them (Step n6).

It then compares the extracted feature counts with the feature counts previously recorded for each face (Step n7).

If the comparison is completed (Step n8), the processor checks whether the condition previously established has been met, in this case, whether the group contains an unauthorized person. If it finds that all the people at the door are authorized (Step n9), it activates the lock to door 16 and permits entry (Step n10).

If it finds that one of the people is unauthorized, the lock to door 16 remains inactivated and entry is denied, or "Entry Denied" is displayed on the screen, or an alarm tone such as a buzzer is output (Step n11).

If the processor determines that the group is permitted to enter, it acknowledges that all members are authorized and permits entry to room 12. This permission causes door 16 to open and the group enters the room (Step n12).

Each result of a decision about entry is stored in memory 21 for use in the next entry operation. The entry data stored in memory 21 can be used to understand who has been allowed entry. The history data concerning individuals who have been refused entry can be used to investigate illegal entries (Step n13).

As described above in connection with the figures, when the system processes data for the person who wishes to enter the room, it detects whether that person is or is not authorized to enter, based on previously recorded data. If the person is authorized, it permits passage; if not, it denies passage. If the system detects that one or more other persons are also present at the door, it determines whether to allow them passage in accordance with a previously established rule. Passage can thus be controlled according to a rule such as "Allow entire group to enter if it contains one authorized person" or "Deny entire group passage if it contains one unauthorized person."

This scheme allows the user to establish a rule to manage the passage of more than one person. Such a rule eliminates the need to match each person's data individually and allows the decision concerning the passage of a number of persons to be made collectively. This eliminates the time spent waiting in line as each person's data is matched and allows passage to be managed appropriately according to the stipulated rule when a number of people wish to enter simultaneously. Furthermore, by setting the rule that no unauthorized person may enter, the user can reliably prevent such a person from entering with an authorized person. This allows the user to maintain high security while allowing the passage of groups of people at the same time.

Furthermore, since the CCD camera can image an entire group of people who wish to enter the room, everyone's data can be matched efficiently from one image. The result is smoothly functioning passage control which allows a number of people to enter simultaneously.

What is claimed as new and desired to be protected by Letters Patent of the United States is:

1. A control system to control passage of a person through a passageway, the system comprising:

data recording means to record facial data in advance representing whether or not the person attempting to pass through said passageway may pass;

facial detecting means to detect, on the basis of on-site facial image data and said facial data recorded in said data recording means, whether the person attempting to pass through said passageway is or is not authorized to pass; and mode setting means to establish a rule for controlling passage through said passageway, said rule being enforced when said facial detecting means detects, based on a comparison of said on-site facial image data and said facial data, at least one unauthorized companion with an authorized person, wherein the at least one unauthorized companion and the authorized person are detected at substantially the same time.

2. The control system according to claim 1, wherein the rule is selected from the group consisting of:

a) allowance of passage for said authorized person and said at least one unauthorized companion, and b) denial of passage for said authorized person and said at least one unauthorized companion.

3. The control system according to claim 1, wherein said facial detecting means detects said at least one companion when said facial detecting means detects the authorized person at the passageway by comparing said on-site facial image data taken by a camera with the recorded facial data in said data recording means.

4. The control system according to claim 1, wherein said passageway is a doorway.

5. The control system according to claim 1, wherein said passageway is a gate.

6. A control system to control passage of a person through a passageway, the system comprising:

data recording means to record facial data in advance representing whether or not the person at the passageway may pass;

facial detecting means to detect, on the basis of on-site facial image data and said facial data recorded in said data recording means, whether the person attempting to pass through said passageway is or is not authorized to pass; and passage rejecting means to reject the passage of the authorized person and at least one unauthorized companion when said facial detecting means detects, based on a comparison of said on-site facial image data and said facial data, said at least one unauthorized companion at the passageway who is with the authorized person, wherein the at least one unauthorized companion and the authorized person are detected at substantially the same time.

7. The control system according to claim 6 further comprising an alarm unit for sounding an alert that an unauthorized companion has been detected by said facial detecting means.

8. A passage control method to control the passage of a plurality of people through a passageway, the method comprising:

detecting the authorized person by comparing on-site facial image data taken currently with previously taken facial image data recorded in a data recording means, wherein the on-site facial image data includes data of the plurality of people;

detecting the at least one authorized companion; and rejecting the passage of said plurality of people in response to said detecting and according to a rule, wherein the plurality of people includes an authorized person and at least one unauthorized companion and the at least one unauthorized companion and the authorized person are detected at substantially the same time.

9. The passage control method according to claim 8, wherein said rule is selected from the group consisting of:

a) allowance of passage for said plurality of people if said plurality of people contains at least one authorized person, and b) denial of passage for said plurality of people if said plurality of people contains at least one unauthorized companion.

10. The passage control method according to claim 9 further comprising sounding an alert when passage for said plurality of people has been denied.

11. A control system to control passage of a plurality of people through a passageway, the system comprising:

data recording means to record facial data in advance representing whether or not a person attempting to pass through said passageway may pass;

facial detecting means to detect, based on a comparison of on-site facial image data and said facial data recorded in said data recording means, whether each person of said plurality of people attempting to pass through said passageway is or is not authorized to pass; and mode setting means to establish a rule for controlling passage through said passageway, said rule being enforced when said facial detecting means detects at least one unauthorized companion with an authorized person, the at least one unauthorized companion and the authorized person are detected at substantially the same time.

12. A control system to control passage of a plurality of people through a passageway, the system comprising:

data recording means to record facial data in advance representing whether or not a person at the passageway may pass;

facial detecting means to detect, based on a comparison of on-site facial image data and said facial data recorded in said data recording means, whether each person of said plurality of people attempting to pass through said passageway is or is not authorized to pass, said on-site facial image data comprising a single image that includes images of each person of said plurality of people attempting to pass through said passageway; and passage rejecting means to reject the passage of an authorized person and at least one unauthorized companion when said facial detecting means detects said at least one unauthorized companion at the passageway who is with the authorized person, wherein the at least one unauthorized companion and the authorized person are detected at substantially the same time.

13. A passage control method to control the passage of a plurality of people through a passageway, wherein the plurality of people includes an authorized person and at least one unauthorized companion, the method comprising:

detecting the authorized person and the at least one unauthorized companion at substantially the same time by comparing on-site facial image data taken currently with previously taken facial image data recorded in a data recording means; and controlling the passage of said plurality of people in response to said detecting and according to a rule.

* * * * *